(12) United States Patent
Hyslop et al.

(10) Patent No.: US 6,666,291 B2
(45) Date of Patent: Dec. 23, 2003

(54) HOOD LATCH AND VEHICLE MOUNTING

(75) Inventors: Christina R. Hyslop, Fort Wayne, IN (US); Charles M. Bivens, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/074,915

(22) Filed: Feb. 11, 2002

(65) Prior Publication Data

US 2003/0150656 A1 Aug. 14, 2003

(51) Int. Cl.[7] .............................................. B62D 25/10
(52) U.S. Cl. .................................. 180/69.21; 180/89.17
(58) Field of Search ............................ 180/69.2, 69.21, 180/69.24, 89.14, 89.16, 89.17, 89.18, 89.19, 69.23; 296/100.07, 100.08, 107.08, 107.11, 190.05, 190.06, 194, 76

(56) References Cited

U.S. PATENT DOCUMENTS

| | | | |
|---|---|---|---|
| 3,599,743 A | * | 8/1971 | Hull ........................ 180/69.21 |
| 3,754,614 A | * | 8/1973 | Habas ...................... 180/69.21 |
| 4,753,475 A | * | 6/1988 | Mochida .................... 296/192 |
| 5,004,062 A | * | 4/1991 | Foot ........................ 180/69.21 |
| 5,101,921 A | * | 4/1992 | West et al. ............... 180/69.21 |
| 6,167,977 B1 | * | 1/2001 | Adamson et al. ........... 180/69.2 |
| 6,394,211 B1 | * | 5/2002 | Palenchar et al. ........ 180/69.21 |
| 6,568,495 B1 | * | 5/2003 | Corder et al. .............. 180/69.2 |

* cited by examiner

Primary Examiner—Brian L. Johnson
Assistant Examiner—Bridget Avery
(74) Attorney, Agent, or Firm—Jeffrey P. Calfa; Dennis Kelly Sullivan; Susan L. Lukasik

(57) ABSTRACT

A hood latch, hood and vehicle-mounting component that provide improved durability and aerodynamic properties as well as access to an under hood area. The latch is a two-part component. The latch is mounted under the hood and is only exposed where it latches to the latch catch on the vehicle-mounting component. The vehicle-mounting component can be engaged to the body of the vehicle or to the chassis of the vehicle. One vehicle-mounting component may be a fender extension. The latch is mounted to an underside of the hood and hence there is overlap of the hood over a portion of the latch. The latch catch may be mounted in a channel formed in the vehicle mounting-component. This design protects the latch from road debris and prevents snow and mud buildup in the latch area. This makes it less difficult for the operator or maintainer to access to open the hood. The mounting of the strap under the hood reduces corrosion to the latch hardware that allows for improved serviceability and longer lasting hardware.

5 Claims, 6 Drawing Sheets

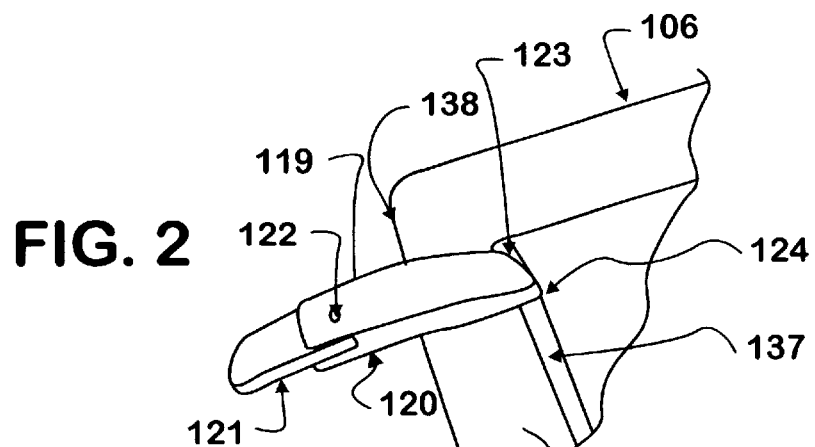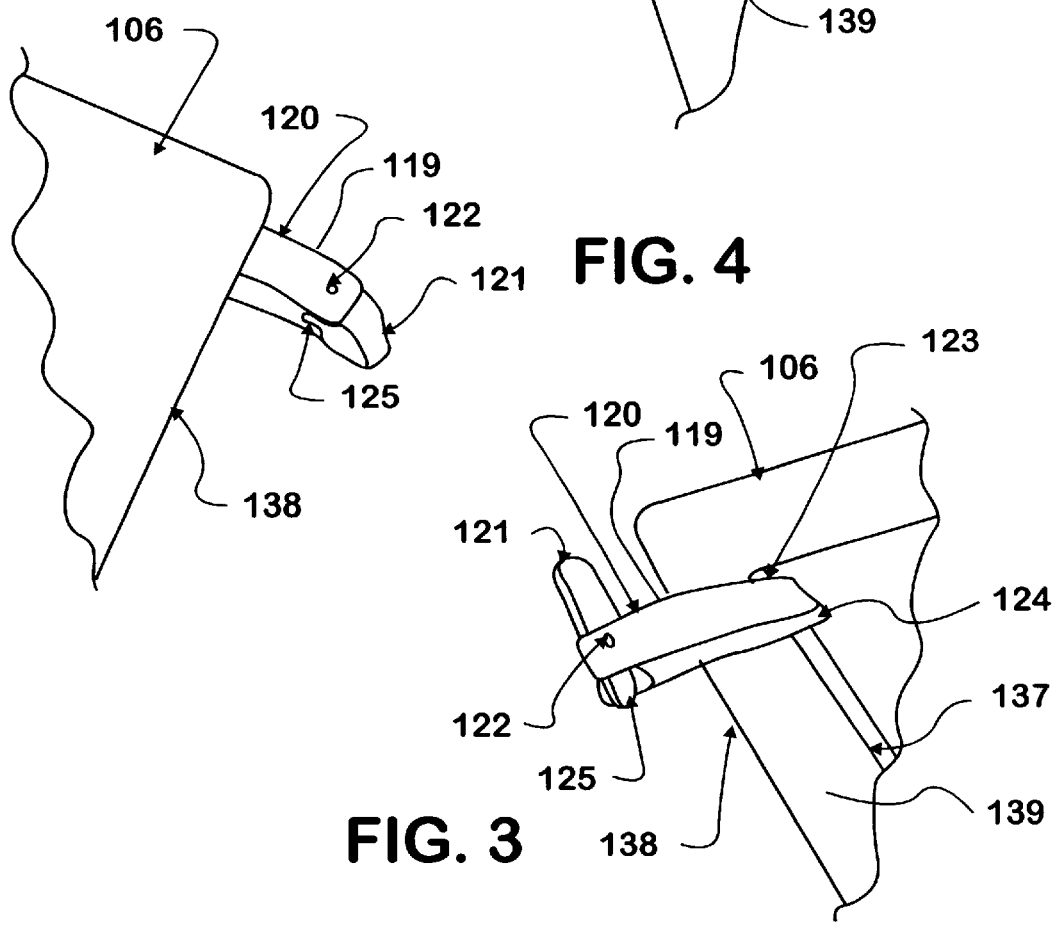

HOOD LATCH AND VEHICLE MOUNTING

BACKGROUND

This invention relates to mobile vehicle hood latches. More specifically, this invention involves the hood latches for engine compartment hoods that swing forward on a forward pivot mechanism. These type hoods are generally latched by a latching mechanism accessible outside of a cab of the vehicle. The hood latch of this invention is improved in that the latch is protected against road debris and prevents snow and mud from building up around the latch. The new latch not only improves aesthetics but also provides a more aerodynamic design to reduce wind drag.

PRIOR ART

Many motor vehicles particularly medium and heavy-duty trucks and school buses engine compartment hoods that swing forward on a forward pivot mechanism on the chassis in the general vicinity of the vehicle front bumper. These types of hoods are generally latched by a latching mechanism accessible outside of a cab of the vehicle. These hoods should be opened once a day for the required pre-trip checks for Commercial Driver Licensed (CDL) drivers. The prior art latch and latch engagement component were mounted to both exterior portions of the hood and fender extension. These latches protruded above the flow of the hood and fender extension causing snow and mud buildup due to interruption of aerodynamic flow. The snow and mud and other debris are swept into these prior art latches due to the outward exposure. The paradigm of these latch designs is that the latches have to be accessible enough to be operated from outside the vehicle while at the same time have to be protected from the outside elements and it is preferable to keep the latches outside the aerodynamic air stream across the vehicle when it is moving. What has not been previously suggested is having a forward tilting hood latching design that is both readily accessible for under hood maintenance and checks and protected from road debris, snow, and mud and does not overtly interfere with aerodynamic air flow.

SUMMARY

The hood latch, hood and vehicle-mounting component of this invention and a vehicle with these components installed satisfy the primary objective of this invention as follows. The latch is a two-part component. The new latch is mounted under the hood and is only exposed where it latches to the latch catch on the vehicle-mounting component. The vehicle-mounting component can be engaged to the body of the vehicle or to the chassis of the vehicle. One vehicle-mounting component may be a fender extension. The latch is mounted to an underside of the hood and hence there is overlap of the hood over a portion of the latch. The latch catch may be mounted in a channel formed in the vehicle mounting-component. This design protects the latch from road debris and prevents snow and mud buildup in the latch area. This makes it less difficult for the operator or maintainer to access to open the hood. The mounting of the strap under the hood reduces corrosion to the latch hardware that allows for improved serviceability and longer lasting hardware.

DRAWINGS

Other objects and advantages of the invention will become more apparent upon perusal of the detailed description thereof and upon inspection of the drawings, in which:

FIG. 2 is a partial view of the hood latch and underside of the hood of FIG. 1, with the hood latch in a closed position.

FIG. 3 is a partial view of the hood latch and underside of the hood of FIG. 1, with the hood latch in an open position.

FIG. 4 is a partial view of the hood latch and outer side of the hood of FIG. 1.

DETAILS OF INVENTION

Figure 1:
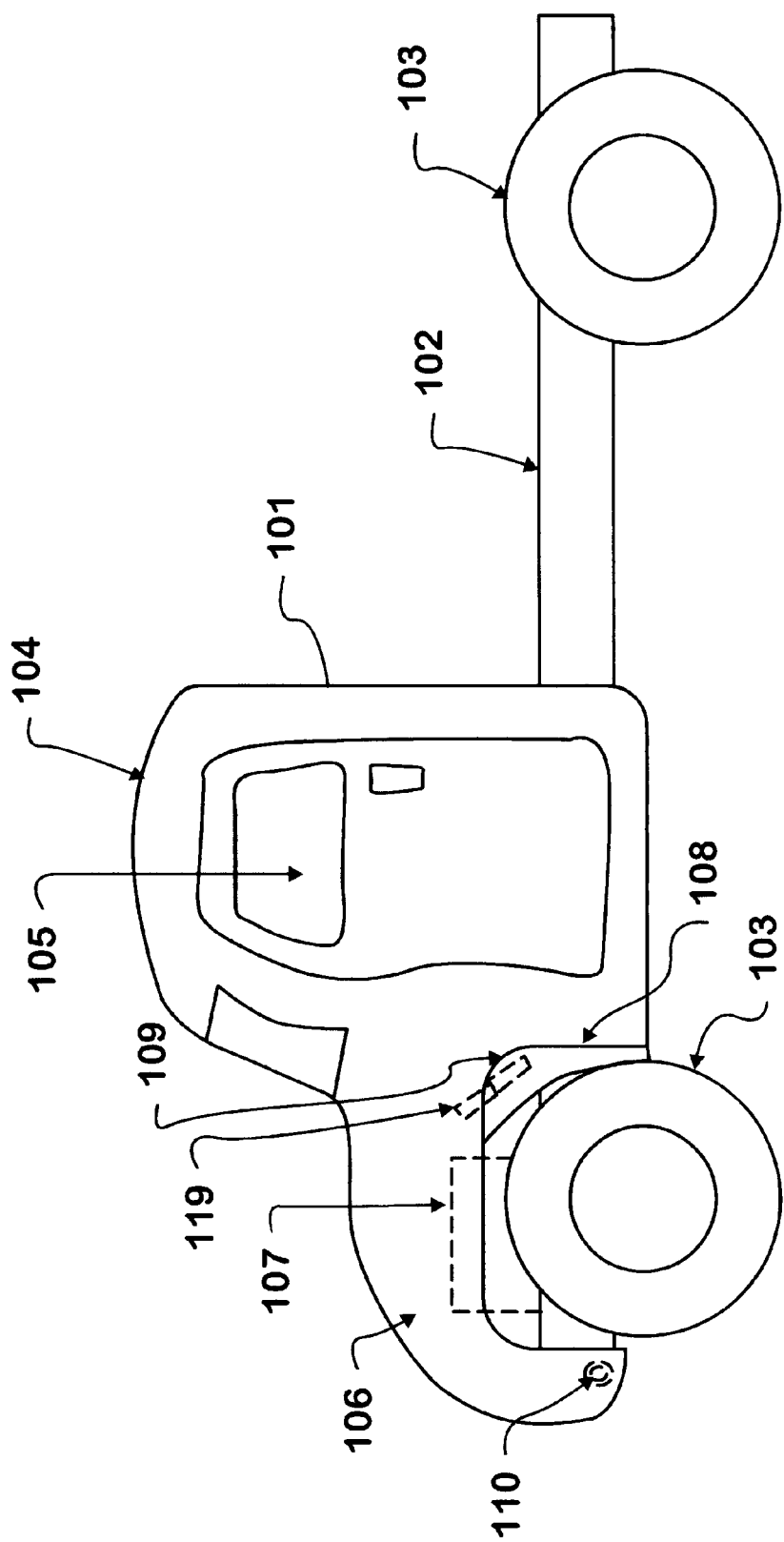
FIG. 1 is a side view drawing of a vehicle with a hood and hood latch made and installed in accordance with this invention.
Figure 5:
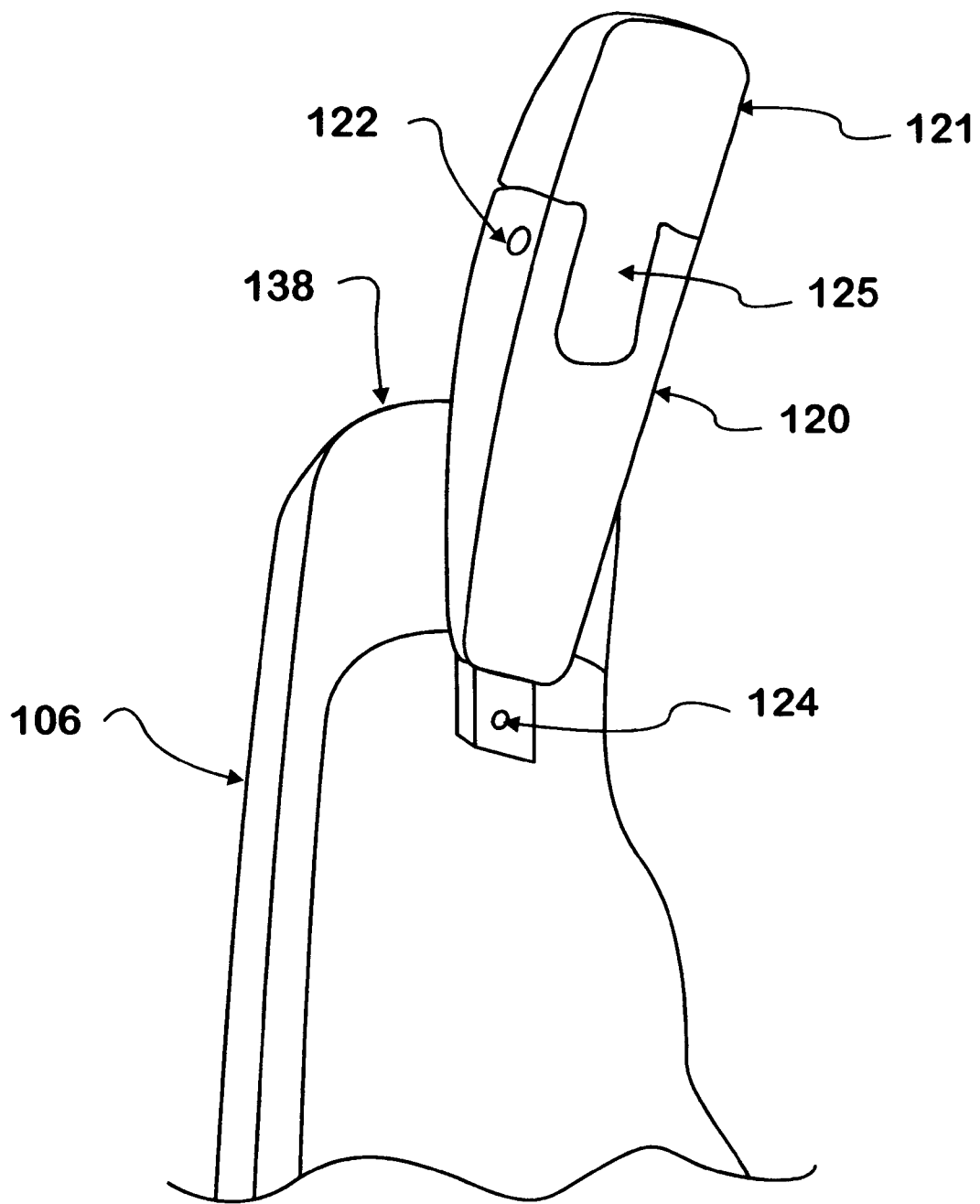
FIG. 5 is a bottom up view of the hood latch and hood of FIG. 2.
Figure 6:
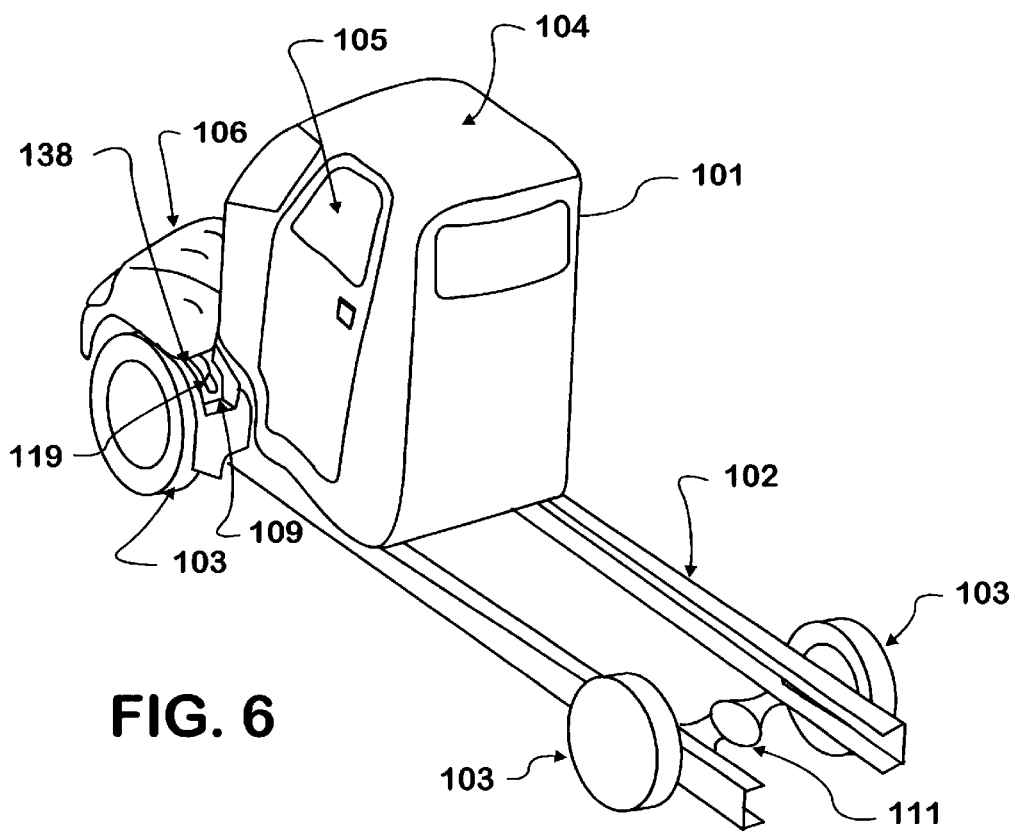
FIG. 6 is a rear quarter perspective view of the vehicle, hood, and hood latch installation of FIG. 1.

This invention can be installed in any type vehicle 101 with a forward tilting hood 106. FIGS. 1 and 6 show a vehicle 101 with a hood latch 119 made in accordance with this invention. The vehicle 101 has a chassis 102 engaged to axles 111 with wheels 103. There is a driver cab 104 engaged to the chassis 102. The cab 104 has a driver compartment 105. There is an engine 107 engaged to the chassis 102 under the hood 106, the engine 107 for providing motive force to the vehicle 101. The hood 106 may be pivoted forward through a forward pivoting mechanism 110 to allow access to the engine 107 and other under hood 106 components. The latch 119 is engaged between an underside area 139 of the hood 106 and a latch catch 151 on a vehicle-mounting component 109.

The latch 119 is a two-part component. See FIGS. 2 to 5. The latch 119 is mounted under the hood 106 and is only exposed where it latches to the latch catch 151 on the vehicle-mounting component 109. The latch 119 is mounted to an underside area 139 of the hood 106 and hence there is overlap of the hood 106 over a portion of the latch 119. The two parts of the latch 119 are a strap 120 and a handle latch 121. A portion of the handle latch 121 fits within forward prongs of the strap 120. The handle latch 121 is connected to the strap 120 to allow rotation through a hinge 122 that is engaged to each of the forward prongs of the strap. The handle latch 121 has an engagement lip or engagement surface 125 for engagement to the latch catch 151 when the latch 119 is made up between the hood 106 and vehicle-mounting component 109. The engagement lip 125 may more specifically engage a key 154 of the latch catch 151 when made up. See FIG. 7. The strap 120 is engaged to the underside area 139 of the hood 106 through a fastener plate 124. The fastener plate 124 may be engaged to an inner engagement face 137 of the hood 106 near an outer corner 123. The result of the engagement of the latch 119 to an inner underside of the hood 106 is that an outer edge 138 of the hood overlaps over the latch 119 when the latch 119 is engaged. This protects the upper portion of the latch 119 from the elements. This overlap of the outer edge 138 of the hood 106 is the important part of this design as other latch designs may be used in this invention. The important aspect is that the upper portion of whatever latch 119 is used is engaged to the inner underside of the hood 106 so that this upper portion and the associated hardware related to the attachment to the hood 106 is protected by the outer edge 138.

The vehicle-mounting component 109 can be engaged to the cab 104 or to the chassis 102 of the vehicle 101. One vehicle-mounting component 109 may be a fender extender 109 as shown in the embodiment in the figures. Another embodiment includes making the vehicle-mounting component 109 a forward portion of the cab 104.

Figure 7:
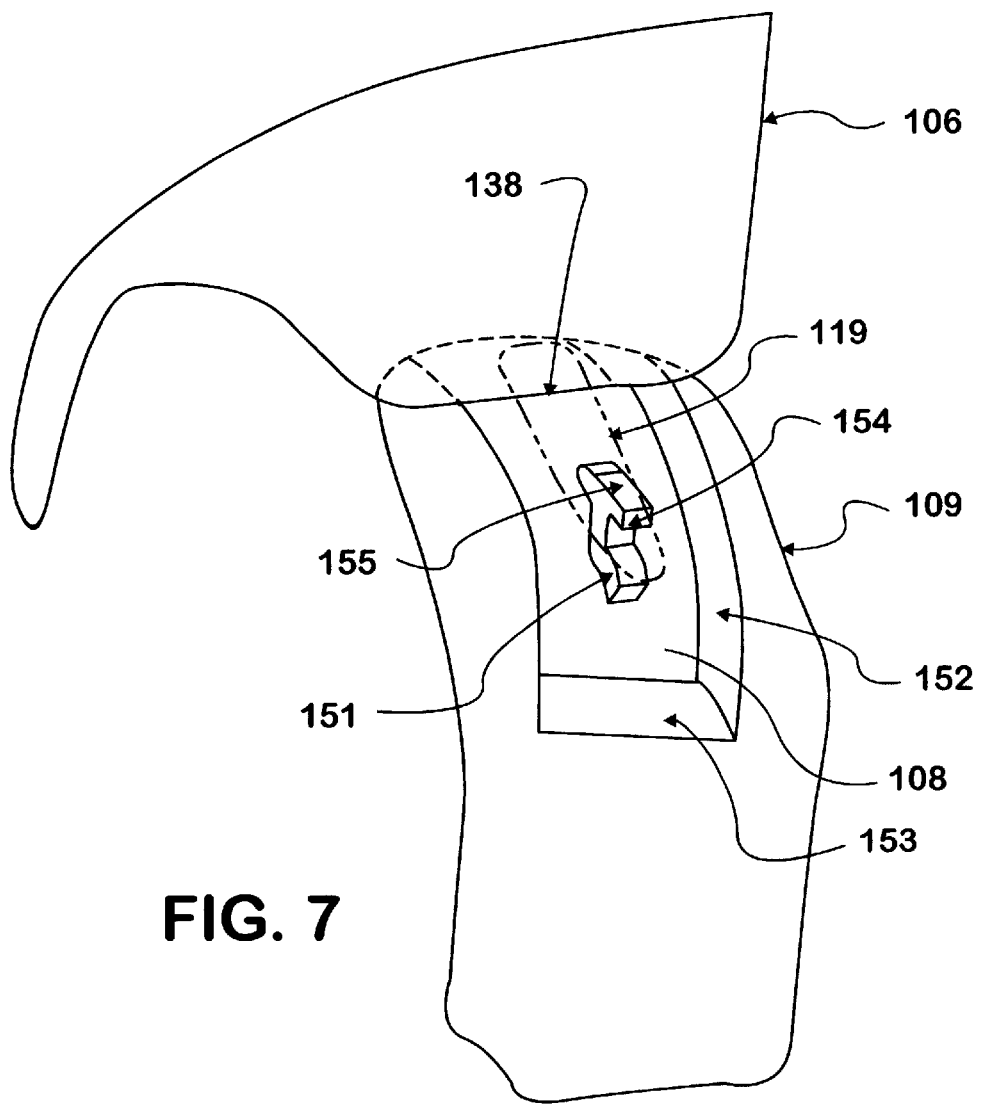
FIG. 7 is a partial view of the hood and vehicle-mounting component with a hood latch shown in phantom of the vehicle and installation of FIG. 1.
Figure 8:
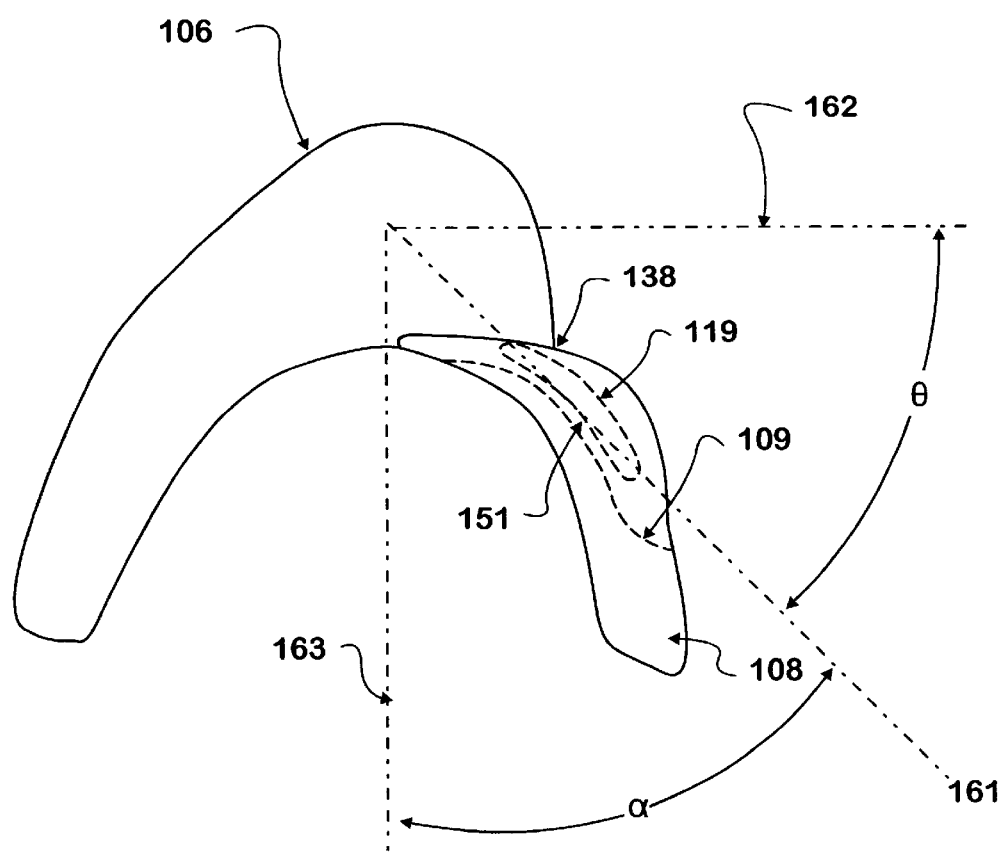
FIG. 8 is a side view of the hood and vehicle-mounting component of FIG. 7.

The latch catch 151 may be mounted in a channel 108 formed in the vehicle mounting-component 109. This is shown in FIGS. 7 and 8. This design protects the latch 119 from road debris and prevents snow and mud buildup in the area around the latch 119. This makes it less difficult for the operator or maintainer to access to open the hood 106. The mounting of a portion of the latch 119 under the hood 106 reduces corrosion to the hardware of the latch 119. This allows for improved serviceability and longer lasting hardware. In the preferred embodiment, the latch 119 may not be seen in a side view due to the relative depth of the channel 108.

The channel 108 may in one embodiment be made up of sidewalls 152 and an end trough 153. The latch catch 151 may have a strap 120 mounting surface 155 on which an inner surface of the strap 120 rests on upon the latch's 119 engagement between the hood and the vehicle-mounting component 109. The channel 108 improves aerodynamics across the hood 106 and body by keeping the latch 119 out of the air stream across this area when the vehicle 101 is moving.

Another aspect of the invention may involve downward angles of the latch 119 upon engagement. As shown in FIG. 8, in a side view the latch 119 and the channel 108 are on a downward angle towards the rear of the vehicle 101. There is an imaginary tangential line 161 that is tangential to the latch 119 when the latch 119 is engaged to the latch catch 151. In one embodiment an angle θ between the tangential line 161 and a horizontal line 162 is greater than an angle α between the tangential line 161 and a vertical line 163. In this preferred embodiment angle θ is greater than 45° (degrees). This downward angle also reduces the susceptibility of the latch 119 and related components to collect mud and snow.

The overall benefit of the overlap of the hood 106 over at least a portion of the strap 120 of the latch 119 along with the channel 108 and downward angle of the latch 119 upon engagement and the downward angle of the channel 108 results in a new latch that meets the objects of the invention. Latches and latch catches of other makes may work along with these component parts and layout and still satisfy the intent of the invention.

As described above, the hood latch 119, hood 106, and vehicle-mounting component 109, and a vehicle 101 with these components installed provide a number of advantages, some of which have been described above and others of which are inherent in the invention. Also modifications may be proposed to the hood latch 119, hood 106, and vehicle-mounting component 109, and a vehicle 101 with this system installed with these components without departing from the teachings herein.

We claim:

1. A hood latch and vehicle in combination, comprising:

a chassis;

a cab engaged to said chassis;

an engine compartment enclosed by a forward pivoting hood engaged to said chassis;

a latch on each side of said hood, engaged to a rearward inner underside of said hood and protruding out from under said hood, thereby providing an overlap of said hood over an upper portion of said latch;

each said latch for engaging an associated latch catch on a vehicle mounting component to engage said hood in a closed position when said latch is engaged to said latch catch;

each said latch only exposed where it latches to said latch catch on said vehicle-mounting component;

each said latch being comprised of two parts, a strap and a handle latch;

a portion of the handle latch fits within forward prongs of said strap and said handle latch is engaged to said strap through a hinge;

each said handle latch having an engagement lip for engagement to said associated latch catch when said latch is made up between said hood and said vehicle-mounting component;

said strap being engaged to said underside area of said hood through a fastener plate; and said latch catch being mounted in a channel formed in said vehicle mounting-component, said latch not being visible in a side view due to relative depth of said channel when said latch is engaged.

2. The hood latch and vehicle combination of claim 1, wherein:

each said latch and channel is at a downward angle in a direction rearward relative to said vehicle when said latch is engaged to said latch catch.

3. The hood latch and vehicle combination of claim 2, wherein:

said downward angle of said latch within said channel is greater than 45 degrees with an imaginary horizontal line.

4. The hood latch and vehicle combination of claim 3, wherein:

said vehicle-mounting component is a fender extender.

5. The hood latch and vehicle combination of claim 3, wherein:

said vehicle-mounting component is a forward portion of said cab.

* * * * *